United States Patent Office 2,956,095
Patented Oct. 11, 1960

2,956,095
LIGHT NAPHTHA ISOMERIZATION PROCESS

Donald Schwartz, Baton Rouge, La., assignor to Esso Research and Engineering Company, a corporation of Delaware No Drawing. Filed June 17, 1958, Ser. No. 742,507
8 Claims. (Cl. 260—683.68)

The present invention relates to a novel process for isomerization of straight chain hydrocarbons, in particular paraffinic hydrocarbons, having 4 to 10 carbon atoms to isoparaffins of high octane value.

Numerous processes have been proposed for converting n-paraffins to isoparaffins. Employed are usually catalysts of the Friedel-Crafts type, such as $AlCl_3$, $AlBr_3$, $ZnCl_2$ and the like. Also, activators such as HCl, HBr, $Fe_2O_3$ and the like have been employed to increase the rate of conversion to the desired isomers.

The use of the Friedel-Crafts catalysts, however, is not completely satisfactory. Thus, although the aluminum chloride isomerization process has long been employed, it requires relatively high temperatures of about 200° to 420° F. for its operation, and under these conditions equilibrium conversions are low and cracking and secondary reaction products are formed. Aluminum bromide isomerization may be carried out at lower temperatures, but here the catalyst is excessively soluble in the reaction product, and catalyst losses appear to be higher than desired.

In accordance with the present invention, a Friedel-Crafts type of isomerization catalyst is dispensed with and there is employed instead a catalyst system comprising a halosulfonic acid and particularly fluosulfonic acid and a compound capable of forming a stable carbonium ion, and in particular a tertiary alcohol. Though other halosulfonic acids such as chlorosulfonic acid may be employed, these compounds show a markedly lower degree of activity. Of the stable carbonium ions that may be employed, tertiary butyl alcohol is preferred, though to a lesser degree tertiary halides, olefins and ethers may be used.

The system fluosulfonic acid and tertiary butyl alcohol are particularly preferred in that their interaction not only forms a stable carbonium ion which is necessary to start the isomerization chain reaction but also may liberate HF from the interaction of water formed from the reaction of alcohol with the fluosulfonic acid.

The catalyst system of the present invention is more reactive than the conventional Friedel-Crafts catalyst and is more versatile. It may be used with high molecular weight compounds such as $C_7$, $C_{10}$, and $C_{16}$ and higher hydrocarbons wherein it induces a cracking as well as isomerization reaction. The halosulfonic acids, such as fluosulfonic acid, by themselves exhibit far lower acticity and conversion than the combination of the acid with the carbonium ion. Particularly desirable as carbonium ion reaction initiators are tertiary compounds whose tertiary carbonium ions have a large number of α hydrogens. Tertiary butyl alcohol has the largest number theoretically possible, namely nine, and this apparently plays an important role in the choice of carbonium ion donors to be employed. Similarly, isobutylene is a desirable stable carbonium ion chain initiator.

As feed to the reaction zone there may be employed paraffinic hydrocarbons having four and more carbon atoms. In particular, the advantages of the catalyst system of the present invention are realized with higher molecular weight alkanes having seven and higher carbon atoms, since the combined cracking-isomerization properties of the fluosulfonic acid are useful in producing high octane compounds from these high molecular weight naphtha constituents.

The reaction conditions desirable for isomerizing normal paraffins such as n-butanes, n-pentanes, n-hexanes and n-heptanes and higher alkanes, either as single compounds or as mixtures, are in the range of 32° to 80° F. and pressures of 0 to 50 p.s.i.g. Preferably, 0 to 200 cubic feet of added hydrogen per barrel are also present. In general, the process of the present invention is more useful and effective in feeds containing the higher n-paraffins which generally crack and badly foul and inactivate the Friedel-Crafts isomerization catalyst. In general, temperatures between 50° and 80° F. may be used for n-butane and n-pentane, and lower temperatures of 32° to 70° F. for the higher n-hydrocarbons. For the production of very highly branched hydrocarbons, the lower temperatures are preferred.

The time of contact is likewise subject to wide variation. In general, contact times between about one-half to three hours are employed, the length of residence being dependent in part upon the temperature employed and the catalyst and activator concentrations. In general, in the temperature ranges given above, a residence period of one to two hours is preferred.

The amount of halosulfonic acid present in the reaction chamber with reference to the total amount of hydrocarbon present may vary from 10 to 100% or even higher. Preferred is generally an amount between about 80 and 100%. Similarly, the amount of carbonium ion donor may vary between 0.5 to 5% of the catalyst, preferably about 1 to 2%.

The carbonium ion activators are preferably these compounds capable of forming relatively stable carbonium ions, and preferably tertiary butyl alcohol or a tertiary butyl halide. Of these tertiary butyl alcohol is superior to tertiary butyl chloride.

The reaction medium is preferably maintained in a state of vigorous agitation, and liquid phase operation has been found to give excellent results. The use of superatmospheric pressures to maintain hydrocarbons in the liquid state may therefore be necessary if higher temperatures are employed.

Unreacted reactants, catalyst, activator and heavier products of the reaction may be separated from the desired isomeric product and from one another and returned in whole or in part to the isomerization zone. The resultant product may be further processed, as by alkylation and the like, or be employed directly as a high octane gasoline blending agent.

The apparatus employed in carrying out the isomerization reaction may consist of a single reactor equipped with efficient stirring devices, such as a mechanical agitator, jets of restricted internal diameter, turbo mixers, etc. Similarly, a series of reactors each equipped as described may be used, either in parallel or series.

The following examples are given illustrating the results obtained by operating in accordance with the present invention.

*Example 1*

A catalyst composition containing about 7.4 ml. fluosulfonic acid and 1 ml. tertiary butyl alcohol was contacted with 7.4 ml. n-heptane at atmospheric pressure in a shaking vessel maintained at room temperature. After two hours the contents of the vessel were removed, neutralized with dilute caustic and the hydrocarbons isolated and yields determined, with the results shown below:

| Product: | Percent |
|---|---|
| $C_3$ | Trace |
| $i\text{-}C_4$ | 7.6 |
| $n\text{-}C_4$ | 1.0 |
| $i\text{-}C_5$ | 15.2 |
| $n\text{-}C_5$ | 2.7 |
| 2,2-dimethyl butane | 6.6 |
| 2,3-dimethyl butane and 2-methyl pentane | 11.0 |
| 3-methyl pentane | 3.1 |
| $n\text{-}C_6$ | 2.1 |
| 2,2-dimethyl pentane+2,4-dimethyl pentane | 3.8 |
| 2,2,3-trimethyl butane | 1.4 |
| 3,3-dimethyl pentane+2-methyl hexane | 5.9 |
| 2,3-dimethyl pentane+3-methyl hexane | 4.1 |
| $n\text{-}C_7$ | 28.9 |
| $C_8$ and higher | 6.5 |

These data show that 71.1% of the n-heptane had been converted, of which product 68% is branched chain, high octane material and 15.2% is converted to i-heptane.

*Example 2*

Under the same reaction conditions as Example 1 but without the addition of tertiary butyl alcohol, only traces of conversion product were noted and these were cracked materials.

*Example 3*

To compare the conversions obtained by the catalyst of the present invention with those obtained by Friedel-Crafts catalyst, the following data are relevant:

Normal heptane was treated with 20 wt. percent aluminum bromide on 40 wt. percent Porocel support for two hours at 78° F. An n-heptane conversion of 67.1% was obtained. Of this product, 16.9% was isomerized to i-heptanes and 50.2% was cracked product.

*Example 4*

In Example 3 there is described a system wherein the catalyst is on a solid support. In the process of the present invention a liquid catalyst system is employed. To compare this with a Friedel-Crafts liquid catalyst system, 20 wt. percent of aluminum bromide was employed in catalyzing the isomerization of a heptane naphtha fraction. This naphtha contains 1.1% $C_4$–$C_6$, 24.8% $i\text{-}C_7$, 33.8% $n\text{-}C_7$, 40.3% $C_7$ naphthenes and 0.04% olefins. Only 10.1% conversion of the normal heptanes was obtained.

What is claimed is:

1. A process for isomerizing paraffinic hydrocarbons which comprises contacting paraffinic hydrocarbons having at least four carbon atoms per molecule with a catalyst composition consisting of fluosulfonic acid and a tertiary alcohol.

2. An improved process for isomerizing a paraffin hydrocarbon having at least four carbon atoms in the molecule which comprises contacting said hydrocarbon in the liquid phase at a temperature from about 32° to about 80° F. and at pressures from atmospheric to about 50 pounds with a catalyst composition consisting of fluosulfonic acid and tertiary butyl alcohol.

3. The process of claim 2 wherein said paraffin hydrocarbon contains between 5 and 16 carbon atoms.

4. The process of claim 2 wherein 10 to 100% of said acid is employed, based on paraffin hydrocarbon, and wherein 0.5 to 5% of said alcohol is employed, based upon said acid.

5. The process of claim 1 wherein said tertiary alcohol is tertiary butyl alcohol.

6. The process of claim 1 wherein said paraffinic hydrocarbons are straight chain hydrocarbons.

7. The process of claim 2 wherein said paraffin hydrocarbon is a straight chain hydrocarbon.

8. An improved process for isomerizing a normal paraffinic hydrocarbon having at least four carbon atoms which comprises contacting said normal paraffinic hydrocarbon with a catalyst consisting of fluosulfonic acid and tertiary butyl alcohol.

References Cited in the file of this patent

UNITED STATES PATENTS

| 2,223,180 | Lynch et al. | Nov. 26, 1940 |
| 2,313,103 | Thomas | Mar. 9, 1954 |
| 2,338,568 | Bartlett | Jan. 4, 1944 |
| 2,344,889 | Lynch | Mar. 21, 1944 |
| 2,344,890 | Whitely | Mar. 21, 1944 |
| 2,379,368 | Matuszak | June 26, 1945 |

OTHER REFERENCES

Journal American Chemical Society, 68, pp. 595 to 599, April, 1946 (5 pages).

Journal American Chemical Society, 71, pp. 2355 to 2359, July, 1949 (5 pages).

Journal American Chemical Society, 76, pp. 5828 to 5831, November 20, 1954, (4 pages).